United States Patent [19]

Poulsen

[11] 4,433,091

[45] Feb. 21, 1984

[54] PAINT MEDIUM FOR APPLYING OVERGLAZE DECORATION TO PORCELAIN AND AN OVERGLAZE PAINT ON BASIS OF THIS MEDIUM

[75] Inventor: Peter Poulsen, Lyngby, Denmark

[73] Assignee: Aktieselskabet Den kongelige Porcelainsfabrik, Copenhagen, Denmark

[21] Appl. No.: 371,987

[22] Filed: Apr. 26, 1982

[30] Foreign Application Priority Data

May 6, 1981 [DK] Denmark .............................. 2010/81

[51] Int. Cl.³ .......................... C08K 5/05; C08L 39/06
[52] U.S. Cl. .................................... 524/386; 524/389; 106/287.23
[58] Field of Search ..................... 106/19, 22, 287.23; 524/386, 389, 403

[56] References Cited

U.S. PATENT DOCUMENTS

| | | | |
|---|---|---|---|
| 3,817,887 | 6/1974 | Mestetsky | 524/386 |
| 4,059,554 | 11/1977 | Pacansky | 524/386 |
| 4,251,400 | 2/1981 | Columbus | 524/386 |
| 4,261,749 | 4/1981 | Johnson | 106/19 |
| 4,290,810 | 9/1981 | Montgomery | 524/386 |

*Primary Examiner*—Theodore Morris
*Attorney, Agent, or Firm*—Holman & Stern

[57] ABSTRACT

A paint medium for applying overglaze decoration to porcelain comprising 15–40% polyvinyl pyrrolidone or a mixture of polyvinyl pyrrolidone with aqueous polyethylene oxide, and 45–85% of ethylene glycol and/or propylene glycol and optionally water.

6 Claims, No Drawings

PAINT MEDIUM FOR APPLYING OVERGLAZE DECORATION TO PORCELAIN AND AN OVERGLAZE PAINT ON BASIS OF THIS MEDIUM

BACKGROUND OF THE INVENTION

1. Field of the Invention

The present invention concerns a paint medium for applying overglaze to porcelain.

2. Description of the Prior Art

In the ceramic industry overglaze paint has hitherto been applied by means of a paint medium the main ingredients of which are fat oils and turpentine and which may further contain various organic solvents and other organic substances of undetermined composition, e.g. tar. These known paint media have substantial drawbacks, in part on account of an inconstant composition which is due to varying provenance of the turpentine, and in part on account of health risk and irritant smell. In later years attention to health risk has increased and now there are prescribed such minimum limits to the contents in the air of especially the constituents of turpentine that the traditional paint media can only be used if at the same time there is a substantial air displacement or adequate ventilation in the premises.

Consequently, there is a need for a paint medium which does not present any health risk and which is composed of well defined constituents so that constant properties may be imparted to it. However, the difficulties in providing such a medium are great as a consequence of the very special properties required from an overglaze paint and which are: that it shall adhere to the glaze, shall dry up quickly to a hard and lustrous film, must not give problems in evaporation and combustion of the constituents, which could result in peeling and crackle of the decoration of drying and burning, must not give rise to an ion reaction between colour and medium resulting in coagulation and lumping, must not foam, and otherwise should be of such nature that the decoration aids are easy to clean. Besides, a new paint medium should preferably have the same technical qualities as the known media on the basis of oil and organic solvents so that the painter has no problems in switching over from one medium to another. Among these qualities which are of special importance to the user are, for example, good moistening, the possibility of painting several times on top of existing paint, and the possibility of varying a brush stroke by taking up paint, i.e., paint removal.

SUMMARY AND PREFERRED EMBODIMENTS OF THE INVENTION

It has now been found that all these conditions are fulfilled by the paint medium according to the invention which comprises:

15-40% by weight of polyvinyl pyrrolidone or a mixture of polyvinyl pyrrolidone and aqueous polyethylene oxide, 45-85% by weight of ethylene glycol and/or propylene glycol, and optionally water.

This paint medium is miscible with water and when variations of colour shade are to be made the user may therefore use either water or paint medium or both for dilution.

It is known from the specification of U.S. Pat. No. 4,261,749 to use polyethylene oxide and polyvinyl pyrrolidone in a medium for printing colour on ceramic articles, but the two substances are here used in admixture with a wax and the medium is so viscous that it cannot be applied as a paint medium but only as a printing medium.

According to the present invention the paint medium may suitably further contain up to 5% by weight of non-ionic tenside. This has the advantage of imparting surface active, foam inhibiting and anti-repelling properties to the medium.

Another advantageous embodiment of the medium is characteristic by further containing up to 20% by weight of butyl diglycol and up to 5% by weight of glycerol.

Butyl diglycol (=diethylene glycol monobutyl ether) increases the lubricating effect of the medium and the precision with which a brush stroke can be made and also provides an anti-repelling effect. Since the substance imparts dryness, a small amount of glycerol is added to counterbalance this effect.

The polyvinyl pyrrolidone used in the present invention preferably has a degree of polymerisation of 90-9000, and the polyethylene oxide used in the instant invention preferably has a degree of polymerisation of 10-10,000 and is best used as a 25% aqueous solution. These two ingredients give the medium substantially the same properties, viz. viscosity and lubricating properties, and they both burn away at low temperature without leaving harmful residues, and they have the effect that brushes do not loose suppleness. The difference in effect is that polyethylene oxide results in a film which is slightly more matt than the one obtained with polyvinyl pyrrolidone.

Ethylene glycol and propylene glycol act in the medium as solvent and as a regulator of the rate of drying. Propylene glycol gives a slightly shorter drying time and a slightly more matt film than ethylene glycol.

The invention also concerns an overglaze paint on basis of the above described medium which paint consists of a mixture of at least 30% colouring matter and at most 70% paint medium. The exact composition of the colour depends on the nature of the colouring matter and the painter's technique. The colouring matter may be oxides and gold and organic gold compounds.

The invention is further illustrated by the following examples in which the percentage is by weight.

EXAMPLE 1

A medium suited for overglaze painting, e.g. lining, has the following composition:

| Polyvinyl pyrrolidone (450) | 30% |
|---|---|
| ethylene glycol | 70% |

EXAMPLE 2

A medium for the same purpose as the medium of example 1 has the following composition:

| Polyvinyl pyrrolidone (450) | 32% |
|---|---|
| propylene glycol | 68% |

EXAMPLE 3

A medium suited for overglaze decoration with small decoration spaces where a firm and bright surface of the dried film is obtained has the following composition:

| | |
|---|---|
| Polyvinyl pyrrolidone (450) | 28.5% |
| ethylene glycol | 66.5% |
| non-ionic tenside* | 5.0% |

*a block polymer of ethylene oxide and propylene oxide of the formula $$HO-(CH_2-CH_2-O)_x-(CH-CH_2-O)_y-(CH_2-CH_2-O)_z-H$$
$$\phantom{HO-(CH_2-CH_2-O)_x-(}|$$
$$\phantom{HO-(CH_2-CH_2-O)_x-(CH}CH_3$$

in which x, y and z have such values that the total molecular weight is 2000 of which about 1750 is constituted by propylene oxide and about 250 by ethylene oxide.

EXAMPLE 4

A medium for the same purpose as the medium of example 3 has the following composition:

| | |
|---|---|
| Polyvinyl pyrrolidone (450) | 10.0% |
| polyethylene oxide | 4.6% |
| water | 13.9% |
| ethylene glycol | 66.5% |
| non-ionic tenside* | 5.0% |

*same as in example 3.

EXAMPLE 5

A medium suited for demanding overglaze decorations which involve many overlapping colours and large spaces where the rate of drying must not be too high, e.g. useful for lining and fond, has the following composition:

| | |
|---|---|
| Polyvinyl pyrrolidone (450) | 25.2% |
| ethylene glycol | 58.8% |
| non-ionic tenside* | 1.5% |
| butyl diglycol | 13.2% |
| glycerol | 1.3% |

*same as in example 3.

EXAMPLE 6

A medium for similar purposes as the medium of example 5 has the following composition:

| | |
|---|---|
| Polyvinyl pyrrolidone (450) | 16.8% |
| polyethylene oxide | 2.1% |
| water | 6.3% |
| ethylene glycol | 58.8% |
| non-ionic tenside (as in ex. 3) | 1.5% |
| butyl diglycol | 13.2% |
| glycerol | 1.3% |

EXAMPLE A

A green overglaze decoration paint is composed by mixing 80% colour of the following composition:

| | |
|---|---|
| $Cr_2O_3$ | 14.5% |
| CoO | 3.7% |
| PbO | 63.8% |
| $SiO_2$ | 12.0% |
| $B_2O_3$ | 6.0% | with 20% medium as described in example 3. The colour shade is regulated by addition of water as the diluent.

EXAMPLE B

A red overglaze decoration paint is composed by mixing 60% colour of the following composition:

| | |
|---|---|
| $Fe_2O_3$ | 10.0% |
| PbO | 70.0% |
| $SiO_2$ | 13.0% |
| $B_2O_3$ | 7.0% | with 40% medium as described in example 4. The colour shade is regulated by addition of water as the diluent.

EXAMPLE C

An overglaze gold decoration is composed by mixing 60% colloidal gold with 40% of a medium as described in example 6. Water is used as diluent depending on the nature of the decoration.

I claim:

1. In a non-turpentine, water-soluble, liquid paint medium for overglaze decoration of procelain the improvement of a medium consisting essentially of, by weight:
   15 to 40% of polyvinyl pyrrolidone or a mixture of polyvinyl pyrrolidone and aqueous polyethylene oxide;
   45 to 85% of ethylene glycol, propylene glycol, a mixture of ethylene glycol and propylene glycol, or a mixture of any of the foregoing with water;
   wherein the following ingredients are present in amounts up to:
   5% of a non-ionic block copolymer of 2,000 molecular weight of which about 1,750 is propylene oxide and about 250 is ethylene oxide;
   20% of butyl diglycol; and
   5% of glycerol.
2. The paint medium of claim 1 wherein the polyvinyl pyrrolidone has a degree of polymerization of 90 to 9,000.
3. The paint medium of claim 1 wherein the polethylene oxide has a degree of polymerization of 10 to 10,000 and is a 25% aqueous solution.
4. The paint medium of claim 2 wherein the polyethylene oxide has a degree of polymerization of 10 to 10,000 and is a 25% aqueous solution.
5. A paint for overglaze decoration of procelain, consisting essentially of, by weight:
   at least 30% of coloring matter;
   at least 70% of the paint medium of claim 1, 2, 3 or 4; and
   water added to the foregoing as desired as a diluent.
6. A paint for overglaze decoration of porcelain, consisting essentially of, by weight:
   at least 30% of coloring matter;
   up to 70% of the paint medium of claim 1 is present wherein the polyvinyl pyrrolidone has a degree of polymerization of 90 to 9,000, wherein the polyethylene oxide has a degree of polymerization of 10 to 10,000 and is a 25% aqueous solution; and
   water added to the foregoing as desired as a diluent.

* * * * *